United States Patent
Baehr et al.

(10) Patent No.: US 12,002,617 B2
(45) Date of Patent: Jun. 4, 2024

(54) MEASURING METHOD AND HIGH-VOLTAGE TRANSDUCER WITH CLEAN AIR

(71) Applicant: HSP Hochspannungsgeräte GmbH, Troisdorf (DE)

(72) Inventors: Sebastian Baehr, Eggolsheim (DE); Sebastian Mueller, Zapfendorf (DE); Udo Prucker, Schwaig (DE)

(73) Assignee: HSP Hochspannungsgeräte GmbH, Troisdorf (DE)

( * ) Notice: Subject to any disclaimer, the term of this patent is extended or adjusted under 35 U.S.C. 154(b) by 648 days.

(21) Appl. No.: 17/048,220

(22) PCT Filed: Mar. 18, 2019

(86) PCT No.: PCT/EP2019/056653
§ 371 (c)(1),
(2) Date: Oct. 16, 2020

(87) PCT Pub. No.: WO2019/201525
PCT Pub. Date: Oct. 24, 2019

(65) Prior Publication Data
US 2021/0175007 A1    Jun. 10, 2021

(30) Foreign Application Priority Data
Apr. 16, 2018   (DE) .......................... 10201820570.5

(51) Int. Cl.
*H01F 27/32*   (2006.01)
*H01F 27/40*   (2006.01)
(Continued)

(52) U.S. Cl.
CPC ......... *H01F 27/321* (2013.01); *H01F 27/402* (2013.01); *H01F 38/30* (2013.01);
(Continued)

(58) Field of Classification Search
CPC ...... H01F 27/321; H01F 27/402; H01F 38/30; H02B 13/0356; H02H 7/042; H04R 2201/02
See application file for complete search history.

(56) References Cited

U.S. PATENT DOCUMENTS 3,953,815 A    4/1976  Raupach
3,980,949 A *  9/1976  Feldtkeller ........... G01R 15/246
                                                       359/324

(Continued)

FOREIGN PATENT DOCUMENTS

CN    202834165 U    3/2013
CN    103956674 A    7/2014
(Continued)

OTHER PUBLICATIONS

Rakov E. G.: "AIR", Great Russian Encyclopedia, Electronic version (2016), https://bigenc.ru/chemistry/text/1924008 English translation.

*Primary Examiner* — Christopher P McAndrew
*Assistant Examiner* — Zannatul Ferdous
(74) *Attorney, Agent, or Firm* — Laurence A. Greenberg; Werner H. Stemer; Ralph E. Locher

(57) ABSTRACT

A high-voltage transducer includes a housing, which spatially encloses at least one electrical measuring device and an insulating gas. The insulating gas is clean air, with which electrical insulation in the housing of the high-voltage transducer is carried out. A method for measuring with the high-voltage transducer is also provided.

18 Claims, 2 Drawing Sheets

Figure 1:
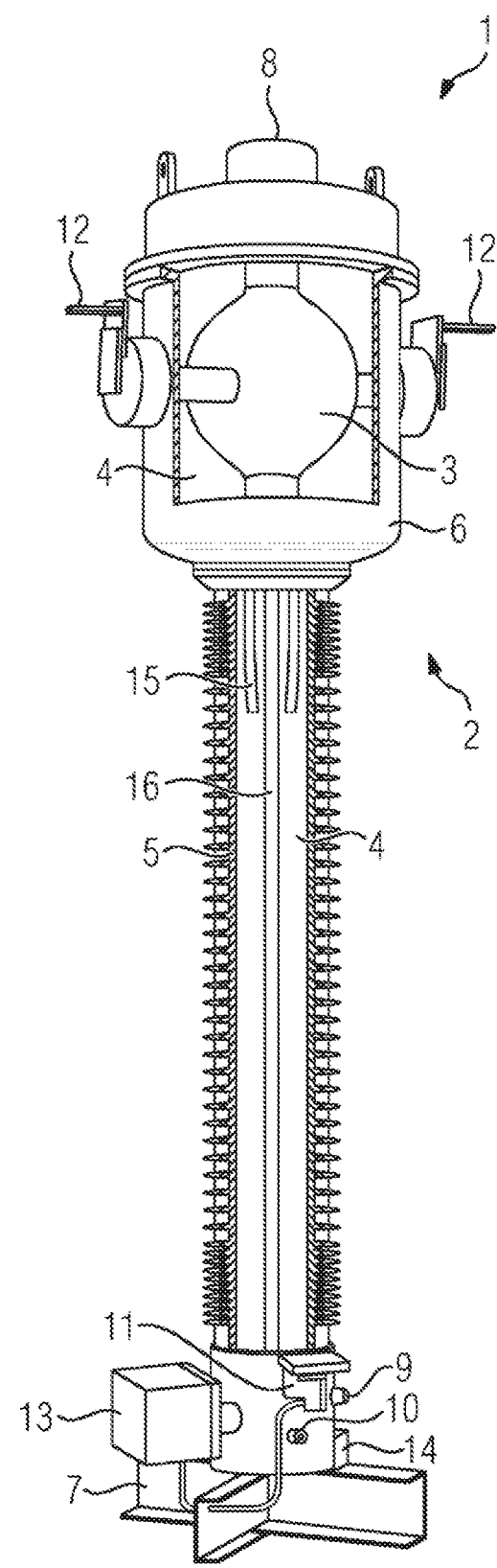

(51) Int. Cl.
*H01F 38/30* (2006.01)
*H02B 13/035* (2006.01)
*H02H 7/04* (2006.01)

(52) U.S. Cl.
CPC ......... *H02B 13/0356* (2013.01); *H02H 7/042* (2013.01); *H04R 2201/02* (2013.01)

(56) References Cited

U.S. PATENT DOCUMENTS

| | | | | |
|---|---|---|---|---|
| 5,548,081 | A | * | 8/1996 | Rost .................. H01F 38/30 |
| | | | | 174/25 G |
| 6,633,168 | B2 | * | 10/2003 | Hopkinson .......... G01R 15/183 |
| | | | | 324/455 |
| 8,908,337 | B2 | | 12/2014 | Gorablenkow et al. |
| 9,903,903 | B2 | | 2/2018 | Kramer et al. |
| 10,373,785 | B2 | | 8/2019 | Kosse |
| 2004/0046581 | A1 | * | 3/2004 | Maekawa ............ G01R 1/0483 |
| | | | | 324/754.03 |
| 2006/0152890 | A1 | | 7/2006 | Yokokura et al. |
| 2009/0289551 | A1 | * | 11/2009 | Scholler ................ H01J 9/266 |
| | | | | 313/623 |
| 2011/0201934 | A1 | * | 8/2011 | Robinson ............. G01S 7/5202 |
| | | | | 600/443 |
| 2015/0290908 | A1 | | 10/2015 | Haruta et al. |
| 2015/0318079 | A1 | | 11/2015 | Eicher et al. |
| 2016/0049773 | A1 | * | 2/2016 | Stifel ...................... F02P 23/04 |
| | | | | 361/230 |
| 2017/0285073 | A1 | * | 10/2017 | Fluri ..................... G01R 15/06 |
| 2018/0142554 | A1 | * | 5/2018 | Kraft ....................... F04C 25/02 |
| 2020/0219642 | A1 | | 7/2020 | Goepfert et al. |
| 2020/0365343 | A1 | * | 11/2020 | Hartung .................. H01H 3/46 |

FOREIGN PATENT DOCUMENTS

| | | | |
|---|---|---|---|
| CN | 203721469 | U | 7/2014 |
| CN | 102403668 | B | 9/2014 |
| CN | 105742044 | A | 7/2016 |
| CN | 207232234 | U * | 4/2018 |
| DE | 1197532 | B | 7/1965 |
| DE | 2356988 | A1 | 5/1975 |
| DE | 3040350 | C2 | 6/1985 |
| DE | 602005002724 | T2 | 7/2008 |
| DE | 202009018213 | U1 | 6/2011 |
| DE | 102010018969 | A1 | 10/2011 |
| DE | 202014003207 | U1 | 7/2014 |
| DE | 102015214043 | A1 | 6/2016 |
| DE | 102015218003 | A1 | 3/2017 |
| DE | 102017206737 | A1 | 10/2018 |
| EP | 0600233 | | 6/1994 |
| EP | 3276633 | A1 | 1/2018 |
| RU | 2211499 | C2 | 8/2003 |
| WO | 2014087940 | A1 | 6/2014 |
| WO | 2014096414 | A1 | 6/2014 |
| WO | WO2019063300 | A1 | 4/2019 |

\* cited by examiner

MEASURING METHOD AND HIGH-VOLTAGE TRANSDUCER WITH CLEAN AIR

BACKGROUND OF THE INVENTION

Field of the Invention

The invention relates to a high-voltage transducer and to a measurement method using the high-voltage transducer, having a housing that spatially encloses at least one electrical measurement device and an insulating gas.

Gas-insulated high-voltage transducers are known for example from EP 0 600 233 A1. In this case, sulfur hexafluoride, that is to say $SF_6$, is used as insulating gas. As an alternative, gases having similar insulating properties may also be used, such as for example fluoroketones and/or fluoronitriles, or gas mixtures, such as for example mixtures of $SF_6$ and $N_2$. Sulfur hexafluoride has the best electrical insulation properties, in particular at high voltages, for example in the range from 72.5 to 800 kV. Alternative gases, such as for example fluoroketones and/or fluoronitriles, have high liquefaction temperatures, as a result of which they are only suitable to a limited extent for open-air uses at low temperatures. Sulfur hexafluoride and the alternative gases have an increased global warming potential. Fluoroketones/nitriles are additionally also hazardous to health.

A gastight high-voltage transducer that is stable over the long term requires a high technical, in particular sealing expenditure and also expenditure in terms of gas filling, gas withdrawal and gas pressure control. During waste disposal at the end of service life or following a malfunction and/or during repairs, insulating gas may escape. Repair or waste disposal without the escape of insulating gas is highly complex. High technical expenditure and associated high costs are required for safe insulating gas handling, without harmful influences on the environment and/or without jeopardizing health.

SUMMARY OF THE INVENTION

The object of the present invention is to specify a high-voltage transducer and a measurement method using the high-voltage transducer that avoid the above-described disadvantages. The object is in particular to specify a high-voltage transducer that has a lower sealing expenditure, less expenditure in terms of insulating gas handling, associated lower costs and lower environmental risks.

The specified object is achieved according to the invention by a high-voltage transducer having the features recited below and/or by a measurement method using the high-voltage transducer according to the invention recited below. Advantageous refinements of the high-voltage transducer according to the invention and/or of the measurement method using the high-voltage transducer according to the invention are specified in the dependent claims. In this case, the subjects of the main claims may be combined with one another and with one or more features of the dependent claims.

A high-voltage transducer according to the invention comprises a housing that spatially encloses at least one electrical measurement device and an insulating gas. The insulating gas is clean air, or clean air is used as insulating gas.

Clean air, that is to say purified air as insulating gas in the housing of the high-voltage transducer, and dispensing with environmentally harmful insulating gases such as for example $SF_6$, cannot harm the environment when the insulating gas escapes from the housing. Lower sealing expenditure is thereby required, less effort is required during insulating gas handling, lower associated costs are required and the environmental risks are reduced.

The high-voltage transducer may be in the form of a current converter, voltage converter or combined converter.

The insulating gas may have a pressure in the range from 6 to 15 bar. This pressure range ensures sufficient electrical insulation of electrical parts, in particular in the case of spatial dimensions of the high-voltage transducer that are similar or identical to the dimensions of high-voltage transducers having $SF_6$ as insulating gas. At lower pressures, the distances between parts that need to be insulated from one another should be increased, as a result of which the high-voltage transducer needs to be designed to be larger in terms of its overall size. Greater pressures mean for example that the walls of the housing need to be designed to be thicker and/or more mechanically stable.

The insulating gas clean air may be and/or comprise synthetic air, in particular consisting of an air mixture containing 80% nitrogen and 20% oxygen or comprising an air mixture containing 80% nitrogen and 20% oxygen. This air mixture, in particular purified and dried, that is to say without or with little air humidity, results in good electrical insulation.

The housing may comprise a support insulator, in particular made from ceramic, silicone and/or from a composite material. The support insulator may allow good electrical insulation of electrical terminals of the at least one electrical measurement device from the ground potential. The housing may comprise a pressurized gas vessel, in particular made from steel and/or aluminum, in particular cast aluminum, which may be in the form of a head housing and/or base housing. The pressurized vessel may spatially enclose the at least one electrical measurement device and be filled with insulating gas. Through an appropriate mechanical design, in particular material selection and wall thickness, the pressurized gas vessel may enclose the insulating gas, in particular under pressure, in a manner that is mechanically stable over the long term.

The housing may be arranged on at least one carrier. The housing may thereby be arranged on the ground and/or a plinth in a mechanically stable manner.

The housing may comprise at least one overpressure device, in particular at least one bursting disk. In the event of an overpressure, insulating gas is thereby able to escape from the housing in a directed manner, for example through bursting of the bursting disk, and people in the surroundings of the high-voltage transducer are protected, in particular from flying parts of the high-voltage transducer that would result from the housing exploding. An overpressure may arise for example due to a malfunction and/or increased heat development. At least one filling terminal and/or test terminal and/or sealtightness monitor may be included in the high-voltage transducer, for example in order to ensure checking and good handling of the insulating gas, in particular when filling and/or discharging insulating gas.

At least two outer electrical terminals may be arranged on the housing for connection to an electricity grid, an electrical consumer and/or a current generator. At least one junction box may be included in the high-voltage transducer, in particular for measurement devices, sensors and/or data recording devices. At least one grounding terminal may be included in the high-voltage transducer in order to ground parts or to be able to apply a ground potential to parts.

At least one current converter and/or at least one voltage converter, in particular having coils and/or having capacitors and/or having resistors, may be included in the housing as at least one electrical measurement device. A combined converter may comprise at least one current converter and at least one voltage converter as measurement device.

At least one control electrode and/or one potential reducer, in particular comprising a film and aluminum coatings, and/or at least one exhaust pipe may be included in the high-voltage transducer. The control electrode may for example make it possible to reduce the potential or to optimize the electrical field in a support insulator. The exhaust pipe may make it possible to apply ground potential, in particular by creating contact between the carrier and ground.

A measurement method according to the invention using an above-described high-voltage transducer comprises electrical insulation being achieved in the housing of the high-voltage transducer through clean air.

The housing of the high-voltage transducer may be filled with clean air, in particular when exchanging the insulating gas $SF_6$ for clean air.

BRIEF DESCRIPTION OF THE SEVERAL
VIEWS OF THE DRAWING

Figure 2:
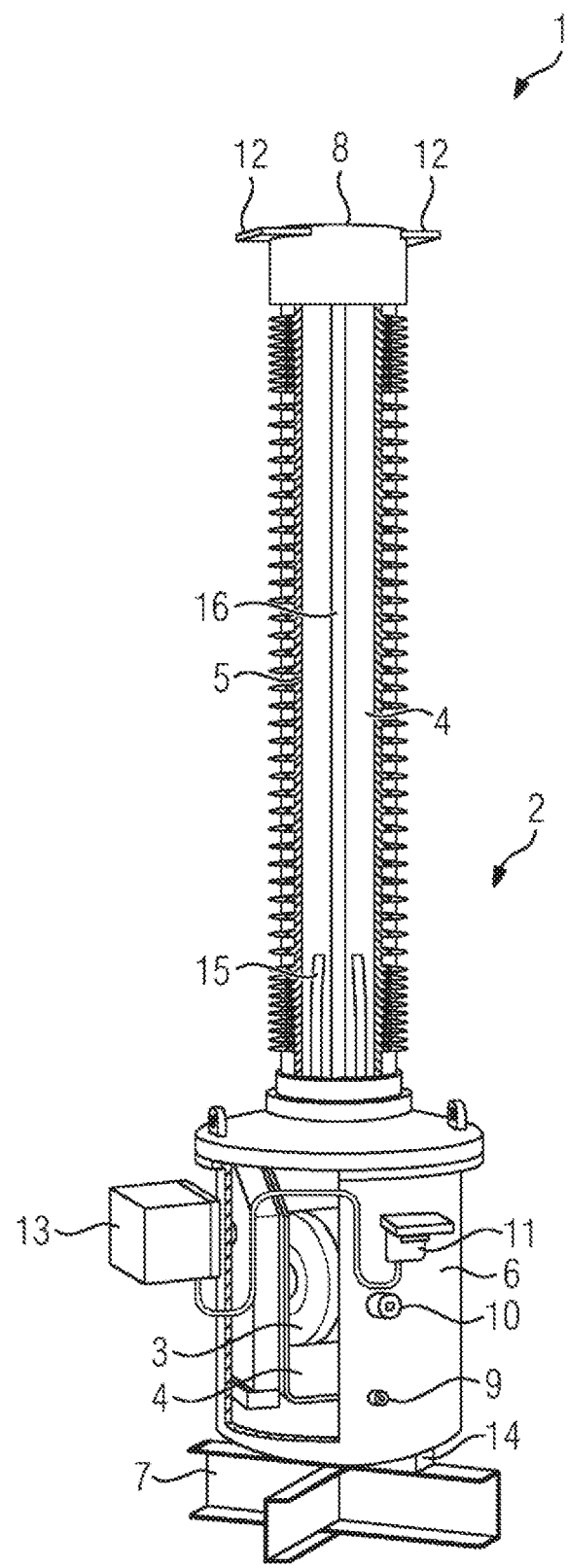

In the figures:

FIG. 1 shows a schematic sectional view of a high-voltage transducer 1 according to the invention seen from one side, with a measurement device 3 in a head housing 6 arranged on a support insulator 5, and FIG. 2 shows a schematic sectional view of an alternative structure of the high-voltage transducer 1 according to the invention seen from one side, with the measurement device 3 in a base housing 6 and a support insulator 5 arranged thereabove.

DETAILED DESCRIPTION OF THE
INVENTION

FIG. 1 illustrates a schematic sectional view of a high-voltage transducer 1 according to the invention from one side. The high-voltage transducer 1 comprises a housing 2 having a support insulator 5 and a pressurized vessel 6. A measurement device 3 of the high-voltage transducer 1 is arranged in the pressurized vessel 6. The measurement device 3 is designed to measure a current in the range from a few hundred to a few thousand amperes and/or to measure a voltage in the range of a few thousand volts, in particular in the range from 145 to 800 kV. The measurement device 3 is designed as a current converter and/or voltage converter, or as a combined converter.

In the exemplary embodiment of FIG. 1, the measurement device 3 comprises a current conductor that is arranged inside the pressurized vessel 6 and is surrounded by an annular coil running around the current conductor. The current conductor is electrically connected, outside the pressurized vessel 6, to an electricity grid, an electrical consumer and/or a current generator via electrical terminals 12. The measurement coil is connected to a junction box 13 via electrically insulated lines, in which junction box measurement devices, sensors and/or data recording devices for measurement signals and the evaluation thereof are arranged or are able to be connected.

The pressurized vessel 6 of the high-voltage transducer 1 according to the invention is arranged on the support insulator 5, which is designed in the shape of a column and is arranged standing upright on a carrier 7. The carrier 7 comprises for example intersecting steel carriers and is attached to a plinth that is not illustrated in the figures for the sake of simplicity. The column-shaped support insulator 5 is fastened on the carrier 7 at one end, this being closed off in a gastight manner. At the end, the junction box 13 is fastened to the column-shaped support insulator 5 and devices, such as for example a filling terminal 9, a test terminal 10 and/or a sealtightness monitor 11, are arranged on the end.

The support insulator 5 and the pressurized vessel 6, according to the invention, are filled with clean air as insulating gas 4 and closed off in a gastight manner in the form of a housing 2. Filling may take place via the filling terminal 9, and the sealtightness and the gas pressure inside may be checked via the test terminal 10 and the sealtightness monitor 11. At the upper end of the column-shaped support insulator 5, the pressurized vessel 6 is designed in the shape of a pot, arranged on the support insulator 5, with a bursting disk as overpressure device 8 on the upper end of the pressurized vessel 6. In the event of a large pressure increase of the insulating gas 4 in the housing 2, for example caused by heating through environmental influences, in particular solar irradiation, through malfunctions or heat development caused by large currents, an overpressure may be discharged upwardly out of the housing 2 through bursting of the bursting disk. Explosion of the support insulator 5 and/or of the pressurized vessel 6, in the event of which flying pieces of debris could injure people in the surroundings, is thereby for example avoided.

The pressurized vessel 6 is for example formed from steel, cast iron and/or aluminum, with a wall thickness that withstands an insulating gas pressure of for example 6 to 15 bar in a manner stable over the long term. The wall thickness is for example in the range from millimeters up to centimeters. The column-shaped support insulator 5 is hollow inside, formed with a wall thickness that likewise withstands the insulating gas pressure of for example 6 to 15 bar in a manner stable over the long term and supports the weight of the pressurized vessel 6 with the connection loads attached thereto. The support insulator 5 is for example made from ceramic, silicone and/or from a composite material. The outer circumference of the support insulator 5 has annular slats running around the outer circumference, arranged at regular intervals along the longitudinal axis of the column-shaped support insulator 5. The creepage current path along the longitudinal axis of the column-shaped support insulator 5 is thereby extended, and the external insulation effect of the support insulator 5 is improved.

An exhaust pipe 16 for grounding the measurement device 3 is arranged inside the column-shaped support insulator 5 along the longitudinal axis and a control electrode 15 is arranged rotationally symmetrically about the exhaust pipe 16 in the upper region of the support insulator 5 in order to improve the field distribution in the area. The control electrode 15 and/or the exhaust pipe 16 are formed in particular from metals with good electrical conductivity, such as for example copper and/or steel.

The insulating gas 4 clean air consists of or comprises synthetic air, in particular 80% nitrogen and 20% oxygen. In the event of a pressure in the range from 6 to 15 bar, the insulating gas 4 clean air electrically insulates regions in the housing 2 of the high-voltage transducer 1 that need to be insulated, in particular in the event of voltages in the range from 145 to 800 KV. In particular in the case of higher voltages, the distances between electrically conductive parts of the high-voltage transducer 1 need to be increased, that is to say the high-voltage transducer 1 needs to be sized larger or the pressure of the insulating gas 4 needs to be increased, wherein the walls of the housing 2 in some cases need to be designed to be thicker in order to achieve sufficient pressure resistance.

FIG. 2 schematically illustrates a sectional view of an alternative structure of the high-voltage transducer 1 according to the invention seen from one side. In contrast to the exemplary embodiment of the high-voltage transducer 1 from FIG. 1, having a head housing 6 on the support insulator 5, FIG. 2 illustrates a high-voltage transducer 1 with a base housing 6 arranged underneath the support insulator 5. The pressurized vessel 6 is arranged directly on the carrier 7, and comprises for example a primary winding and a voltage converter core as measurement device 3 of the high-voltage transducer 1. The column-shaped support insulator 5 is arranged on the pressurized vessel 6 and has electrical terminals 12 on the upper end of the support insulator 5 for connecting the high-voltage transducer 1 to an electricity grid, an electrical consumer and/or a current generator.

The measurement device 3 is designed to measure for example a voltage in the range of a few thousand volts, in particular in the range from 72.5 to 800 kV. The measurement device 3 in the exemplary embodiment of FIG. 2 is designed as a voltage converter, but may also be designed as a current converter or as a combined converter, this not being illustrated in FIG. 2 for the sake of simplicity. The measurement device 3 is connected to a junction box 13 via electrically insulated lines, in which junction box measurement devices, sensors and/or data recording devices for measurement signals and the evaluation thereof are arranged or are able to be connected. The junction box 13 is laterally attached to the pressurized vessel 6 of the high-voltage transducer 1. Devices, such as for example a filling terminal 9, a test terminal 10 and/or a sealtightness monitor 11, are likewise arranged or formed on the pressurized vessel 6.

The support insulator 5 and the pressurized vessel 6, as parts of the housing 2 closed off in a gastight manner, are filled, according to the invention, with clean air as insulating gas 4. Filling may take place via the filling terminal 9, and the sealtightness and the gas pressure inside may be checked via the test terminal 10 and the sealtightness monitor 11. At the lower end of the column-shaped support insulator 5, the pressurized vessel 6 is designed in the shape of a pot and is arranged on the carrier 7. A bursting disk as overpressure device 8 is formed on the upper end of the column-shaped support insulator 5. In the event of a large pressure increase of the insulating gas 4 in the housing 2, for example caused by heating through environmental influences, in particular solar irradiation, through malfunctions or heat development caused by large currents, an overpressure may be discharged upwardly out of the housing 2 through bursting of the bursting disk. As in the exemplary embodiment of FIG. 1, explosion of the support insulator 5 and/or of the pressurized vessel 6, in the event of which flying pieces of debris could injure people in the surroundings, is thereby avoided.

The column-shaped support insulator 5 is hollow inside, designed with a wall thickness that withstands the insulating gas pressure of for example 6 to 15 bar in a manner stable over the long term. The support insulator 5 consists for example of ceramic, silicone, fiberglass-reinforced plastic and/or of a composite material. The outer circumference of the support insulator 5 has annular slats running around the outer circumference, arranged at regular intervals along the longitudinal axis of the column-shaped support insulator 5. The creepage current path along the longitudinal axis of the column-shaped support insulator 5 is thereby extended, and the external insulation effect of the support insulator 5 is improved. An exhaust pipe 16 for connecting the measurement device 3 to the terminals 12 is arranged inside the column-shaped support insulator 5 along the longitudinal axis, and a control electrode 15 and/or a reducer, in particular comprising a foil and/or aluminum coatings, is arranged rotationally symmetrically about the exhaust pipe 16 in the lower region of the support insulator 5 in order to improve the field distribution in the area. The control electrode 15 and/or the exhaust pipe 16 are in particular formed from metals with good electrical conductivity, such as for example copper and/or steel.

The housing 2 with the pressurized vessel 6 and the column-shaped support insulator 5 standing upright on the pressurized vessel 6 is arranged on the carrier 7, which is attached for example to a plinth, which is not illustrated in FIG. 2 for the sake of simplicity. In the exemplary embodiment of FIG. 2, the carrier 7 comprises intersecting steel carriers. The plinth is for example a concrete plinth. The pressurized vessel 6 is formed for example from steel, cast iron and/or aluminum.

The pressurized vessel 6 and the column-shaped support insulator 5 are filled with clean air according to the invention, in particular with an insulating gas pressure in the range from 6 to 15 bar. The wall thickness of the pressurized vessel 6 and of the support insulator 5 are each designed, depending on the material, to withstand an insulating gas pressure of for example 6 to 15 bar in a manner stable over the long term.

The insulating gas 4 clean air, as in the exemplary embodiment of FIG. 1, consists of or comprises synthetic air, in particular 80% nitrogen and 20% oxygen. In the event of a pressure in the range from 6 to 15 bar, the insulating gas 4 clean air electrically insulates regions in the housing 2 of the high-voltage transducer 1 that need to be insulated, in the case for example of voltages in the range from 72.5 to 800 kV. In the case of higher voltages, the distances between electrically conductive parts of the high-voltage transducer 1 need to be increased, that is to say the high-voltage transducer 1 needs to be sized larger or the pressure of the insulating gas 4 needs to be increased, wherein the walls of the housing 2 may in some cases need to be designed to be thicker in order to achieve sufficient pressure resistance.

The exemplary embodiments described above may be combined with one another and/or may be combined with the prior art. By way of example, combined converters may be designed with a head vessel 6 and/or a base vessel 6. The pressurized gas vessel 6 may consist of steel, cast iron and/or aluminum, in particular cast aluminum. When using steel encapsulations, in particular made from ferritic and/or austenitic, antimagnetic steel, it is possible to achieve higher insulating gas pressures and implement more compact designs of the high-voltage transducer 1. When using base vessels 6 made for example from cast aluminum, it is possible to achieve only relatively low insulating gas pressures, and distances have to be increased. This leads to a less compact structure of the high-voltage transducer 1. In order to further increase the dielectric strength of electrode paths, the electrodes may be surface-treated with a dielectric medium. Insulating components in the high-voltage transducer 1 have to be suitable for air insulation. At higher operating pressures, the overpressure device, that is to say the bursting disk, for example has to be enlarged.

Using clean air as insulating gas in the high-voltage transducer 1 according to the invention is environmentally friendly, possible down to minus fifty degrees Celsius and below, does away with specialist gas handling equipment that is necessary when using SF$_6$, and saves on costs for gas recycling. Clean air is easy to produce, in particular in situ, not poisonous and not liquid at ambient temperatures and pressures. Clean air is thus readily able to be used as insulating gas, that is to say for electrical insulation purposes.

LIST OF REFERENCES SIGNS 1 high-voltage transducer
2 housing
3 measurement device, in particular current converter and/or voltage converter
4 insulating gas
5 support insulator
6 pressurized gas vessel
7 carrier
8 overpressure device, in particular bursting disk
9 filling terminal
10 test terminal
11 sealtightness monitor
12 electrical terminal
13 junction box
14 grounding terminal
15 control electrode
16 exhaust pipe

The invention claimed is:

1. A high-voltage transducer, comprising:
a housing;
at least one electrical measurement device spatially enclosed by said housing; and
an insulating gas being clean air spatially enclosed by said housing, said clean air insulating gas being or including synthetic air containing 80% nitrogen and 20% oxygen.

2. The high-voltage transducer according to claim 1, wherein the high-voltage transducer is a current converter, a voltage converter or a combined converter.

3. The high-voltage transducer according to claim 1, wherein the insulating gas is at a pressure in a range from 6 to 15 bar.

4. The high-voltage transducer according to claim 1, wherein said housing is a head housing or a base housing, and said housing includes at least one of a support insulator or a pressurized gas vessel.

5. The high-voltage transducer according to claim 4, wherein:
said support insulator is made of at least one of ceramic, silicone, fiberglass-reinforced plastic or a composite material; or
said pressurized gas vessel is made of at least one of steel, aluminum or cast aluminum.

6. The high-voltage transducer according to claim 1, which further comprises at least one carrier on which said housing is disposed.

7. The high-voltage transducer according to claim 1, wherein said housing includes at least one of:
at least one overpressure device, or
at least one filling terminal, or
at least one test terminal, or
at least one seal tightness monitor.

8. The high-voltage transducer according to claim 7, wherein said at least one overpressure device is at least one bursting disk.

9. The high-voltage transducer according to claim 1, which further comprises at least one of:
at least two outer electrical terminals disposed on said housing, or
at least one junction box disposed on said housing, or
at least one grounding terminal disposed on said housing.

10. The high-voltage transducer according to claim 9, wherein said at least two outer electrical terminals are configured for connection to at least one of an electricity grid, an electrical consumer or a current generator.

11. The high-voltage transducer according to claim 9, wherein said at least one junction box contains at least one of measurement devices, sensors or data recording devices.

12. The high-voltage transducer according to claim 1, wherein said at least one electrical measurement device disposed in said housing includes at least one of:
at least one current converter, or
at least one voltage converter having at least one of coils or capacitors or resistors.

13. The high-voltage transducer according to claim 1, which further comprises at least one of:
at least one control electrode, or
at least one potential reducer, or
at least one exhaust pipe.

14. The high-voltage transducer according to claim 13, wherein said at least one potential reducer includes at least one of a foil or aluminum coatings.

15. A measurement method, which comprises:
providing a high-voltage transducer having a housing;
providing at least one electrical measurement device in the housing; and
using clean air insulating gas to achieve electrical insulation in the housing, the clean air insulating gas being or including synthetic air containing 80% nitrogen and 20% oxygen.

16. The measurement method according to claim 15, which further comprises filling the housing of the high-voltage transducer with the clean air when exchanging SF$_6$ insulating gas for clean air.

17. A high-voltage transducer, comprising:
a housing;
at least one electrical measurement device spatially enclosed by said housing; and
an insulating gas being clean air spatially enclosed by said housing;
said clean air insulating gas being or including synthetic air containing 80% nitrogen and 20% oxygen; and
said clean air insulating gas being at a pressure in a range from 6 to 15 bar.

18. A measurement method, which comprises:
providing a high-voltage transducer having a housing;
providing at least one electrical measurement device in the housing; and
using clean air insulating gas to achieve electrical insulation in the housing, the clean air insulating gas being or including synthetic air containing 80% nitrogen and 20% oxygen, and the clean air insulating gas being at a pressure in a range from 6 to 15 bar.

* * * * *